May 4, 1965 C. F. ALBRECHT 3,181,975
HYDROMETER ATTACHMENT DEVICE FOR BATTERIES
Filed Feb. 27, 1961
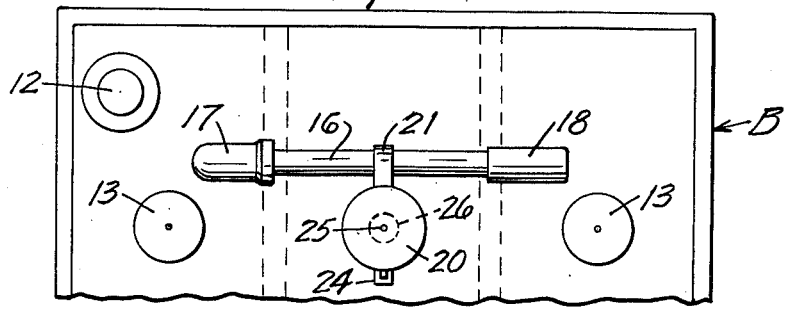
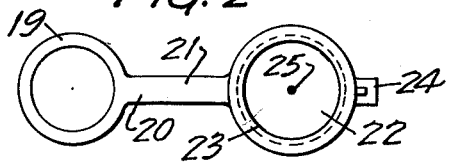
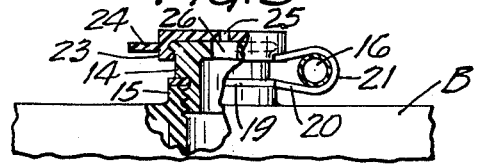
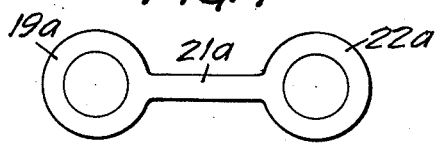
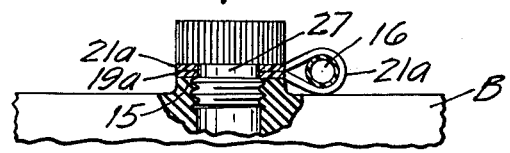
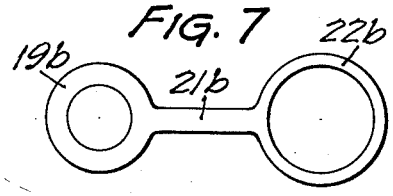
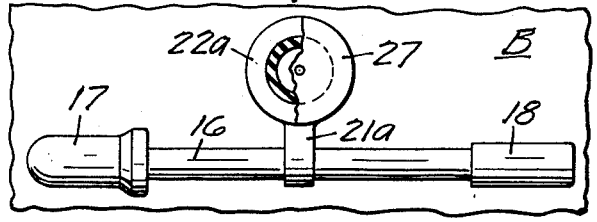
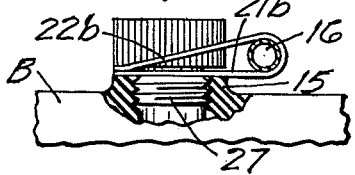
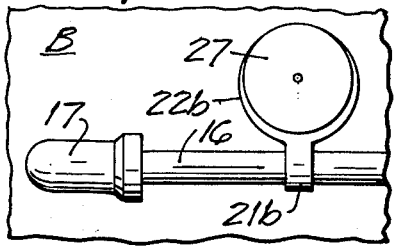
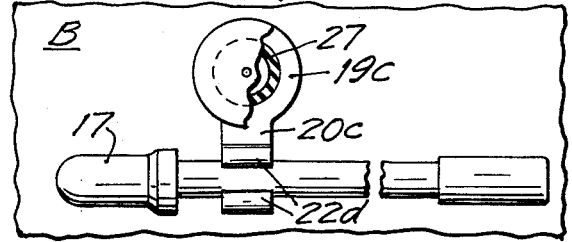
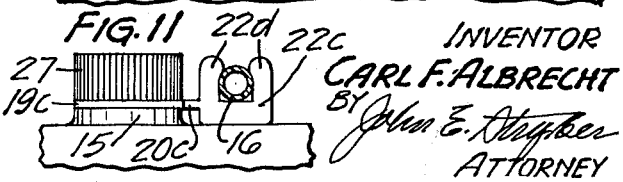
INVENTOR
CARL F. ALBRECHT
BY
ATTORNEY United States Patent Office 3,181,975
Patented May 4, 1965

3,181,975
HYDROMETER ATTACHMENT DEVICE FOR BATTERIES
Carl F. Albrecht, St. Paul, Minn., assignor to Gould-National Batteries, Inc., St. Paul, Minn., a corporation of Delaware
Filed Feb. 27, 1961, Ser. No. 91,725
5 Claims. (Cl. 136—181)

This invention relates to a device for attaching a hydrometer to a storage battery of the common type having a liquid electrolyte which is subject to change in specific gravity, and a filling neck and vent cap which allow access to the electrolyte for testing and replenishment purposes.

Heretofore it has not been feasible for most operators of battery equipped motor vehicles to carry a full size hydrometer in the vehicle for testing the batteries. Experience has shown also that the attendants at service station sometimes neglect to test batteries because of the inconvenience of bringing a station hydrometer to the vehicle. Many farmers, motor boat operators, and other operators of automobiles, trucks and tractors maintain their own vehicles and do not visit service stations, except on rare occasions. My device is particularly adapted for use by vehicle operators.

The present invention has for its principal object to provide a small battery test hydrometer and low cost means for attaching it to the cover of a storage battery where the hydrometer is readily accessible and at all times visible and at hand for use when the battery is inspected.

A further and particular object is to provide a simple, inexpensive device for attaching a hydrometer to a filling neck of a battery cell in such position that the hydrometer is protected by the adjacent protruding filling neck and vent cap against accidental breakage or damage.

My invention also includes certain other features and details of construction which will be more fully pointed out in the following specification and claims.

Referring to the accompanying drawing, which illustrates, by way of example and not for the purpose of limitation, certain selected forms of my invention:

FIGURE 1 is a top plan view showing a preferred form of the invention including a hydrometer attached to a battery of common type;

FIG. 2 is a bottom plan view of the device shown in FIG. 1, in extended position and separate from the battery;

FIG. 3 is a fragmentary part side elevational and part vertical sectional view of the device shown in FIG. 1, in place on the battery;

FIG. 4 is a plan view of a modified form of the attaching device;

FIG. 5 is a part side elevational and part vertical sectional view showing the modification of FIG. 4 in place on a battery;

FIG. 6 is a part plan view and part horizontal sectional view showing the device of FIGS. 4 and 5 in place on the battery;

FIG. 7 is a plan view showing a further modification of the device;

FIG. 8 is a side view of the device of FIG. 7 in place on a battery cell, a portion of the cell cover and filling neck being shown in section;

FIG. 9 is a fragmentary plan view showing the device of FIGS. 7 and 8, and

FIGS. 10 and 11 are plan and side elevational views respectively showing a further modification of my device, a portion of the filling neck being shown in horizontal section in FIG. 10.

FIG. 1 shows a fragmentary portion of a battery B of common type having a terminal post 13 projecting upwardly from one of the cells, the battery being of the common three-cell type and having a vent cap 13 for each of the end cells. A special vent cap 14 (FIG. 3) is provided for the center cell and is adapted to detachably fit a filling neck of the center cell, which is formed with an internally threaded opening communicating with the battery cell. The cap 14 may be formed from a somewhat elastic plastic and may be either threaded to fit the neck 15, or may be of the snap-on or press fit plug type.

A small hydrometer, indicated generally by the numeral 16 may be removably fastened to the filling neck 15 and cap 14 by any of the attaching devices hereinafter described. The hydrometer has a bulb 17 at one end for drawing liquid from the battery cell and an extension 18 at the other or open end is adapted to be extended into the filling neck of the battery when a test is to be made.

Referring to the form of the invention shown in FIGS. 1–3, the attaching device has a circular gasket 19 formed to fit between an annular shoulder on the cap 14 and the upper surface of the filling neck 15. From one side of the basket 19 a tongue member 20 projects and has a continuation 21 which is adapted to be bent around the hydrometer 16 to secure it in parallel relation to the battery cover, as indicated in FIGS. 1 and 3. Integral with the free end of the extension 21 is a fastening member comprising an auxiliary cap indicated generally by the numeral 22. This cap is adapted to fit over the upper end of the vent cap 14 and to snap into place thereon, being constructed from flexible elastic material such as rubber or synthetic rubber, or other elastic synthetic resin. An annular flange 23 is formed on the auxiliary cap member 22 to embrace the periphery of a vent cap 14. At its periphery remote from the tongue extension 21, the member 22 is formed with a finger tab 24 which facilitates the manipulation of the cap in attaching it to and detaching it from the vent cap 14. The auxiliary cap 22 has a small vent opening 25 which communicates with a larger opening 26 in the upper end of the vent cap 14. The opening 26 is sufficiently large to permit the insertion of the hydrometer 16 into the battery cell for withdrawing a test sample of the electrolyte.

As further shown in FIGS. 1–3, the gasket 19 securely fastens the tongue member 20 to the battery cell and it is unnecessary to remove the vent cap 14 to test the specific gravity of the electrolyte. By removing the snap-on cap 22 from the vent cap 14, the hydrometer 16 is released and may be used to make the specific gravity tests of the center cell and of the other cells with a minimum of effort. After each use the hydrometer 16 is mounted securely in the embrace of the elastic tongue extension 21 and is positioned horizontally below the tops of the vent caps where it is protected against accidental breakage.

Referring to FIGS. 4 and 5, the modification of the device here shown comprises a circular gasket 19a, an integral tongue extension member 21a and a gasket-like fastening ring 22a constructed from suitable elastic material so that the gasket 19a and ring 22a may be sprung over the tubular body of a vent cap 27 and confined thereon between the upper surface of the filling neck 15 and the lower surface of a shoulder formed on the cap 27. The cap 27 is merely removed from the filling neck to release the hydrometer and allow access to the electrolyte to be tested.

As shown in FIGS. 7, 8 and 9, the attaching device has a gasket member 19b, a tongue extension member 21b and an integral elastic loop member 22b adapted to be extended around the vent cap 27, as indicated in FIGS. 8 and 9, when the hydrometer is not in use. When the hydrometer is to be used the loop member 22b is merely detached from the vent cap 27, thereby releasing the hydrometer. The cap 27 is removed from the filling neck when it is desired to gain access to the electrolyte in the cell.

According to the further modification shown in FIGS. 10 and 11, the attaching device has a circular gasket member 19c, a tongue member 20c and a substantially U-shaped holder 22c which is integral with the tongue member 20c. Resilient gripping members 22d of the holder 22c are adapted to be sprung apart to receive the hydrometer 16 and to resiliently grip the latter when released.

By mounting the hydrometer on the cover of the battery I call attention to the need for testing the electrolyte and facilitate the making of the tests. Each of the several variations of my invention provides an elastic cushion and holder for the hydrometer closely adjacent to one of the filling necks and its vent cap, thus protecting the hydrometer against damaging vibration and likelihood of breakage. Simplicity and low cost are further advantageous characteristics of my devices.

I claim:

1. In a battery cell having a filling neck projecting upwardly therefrom and a vent cap for said neck, the combination of a hydrometer having a tubular member and a device for attaching said hydrometer to said neck and cap comprising, a gasket fitting between the upper surface of said neck and abutting surface of said vent cap, a tongue member integral with said gasket and projecting laterally from one side thereof, and an elastic holder member integral with said tongue member and of such length as to embrace said tubular member and securely hold the hydrometer in a horizontal position adjacent to one side of said neck.

2. A device in accordance with claim 1 in which said elastic holder member comprises an extension of said tongue formed to embrace and hold the hydrometer, and means for connecting said tongue extension at its free end to said cap.

3. A device in accordance with claim 2 in which said means for connecting said tongue extension to the cap comprises an elastic loop formed to detachably embrace the cap.

4. A device in accordance with claim 2 in which said means for connecting the tongue extension to said vent cap comprises an auxiliary snap-on cap of flexible elastic material formed to cover the upper surface of said vent cap and frictionally engage the periphery thereof.

5. A device in accordance with claim 1 in which said holder member comprises a substantially U-shaped member having a pair of fingers adapted to resiliently grip the hydrometer.

References Cited by the Examiner
UNITED STATES PATENTS 2,779,985 2/57 Turner et al. _____ 24—73 X
2,971,045 2/61 August _____ 136—178

JOHN H. MACK, *Primary Examiner.*

JOSEPH REBOLD, JOHN R. SPECK, *Examiners.*